2,992,969
METHOD OF REPELLING RODENTS

Earl J. Roberts and Charles H. Mack, New Orleans, La., assignors to the United States of America as represented by the Secretary of Agriculture
No Drawing. Filed Dec. 10, 1959, Ser. No. 858,834
4 Claims. (Cl. 167—46)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to, and has as its object, the use of certain morpholine-olefinic polycarboxylic ester adducts, namely, triallyl morpholinyltricarballylate, triethyl morpholinyltricarballylate, and dibutyl morpholinylsuccinate as rodent repellents.

In general, the invention provides a method of repelling rodents which involves applying to the environment from which rodents are to be repelled a rodent repellent containing one of the aforementioned morpholine-olefinic polycarboxylic ester adducts as its essential active ingredient.

In preparing the aforesaid adducts a compound containing an olefinic linkage flanked by carboxylic ester groups and selected from the group consisting of triallyl aconitate, triethyl aconitate, and dibutyl fumarate or maleate, is reacted with morpholine, as will be more fully described hereafter and in the examples given hereinafter to produce the adducts listed above in the order set forth. In this addition reaction, the hydrogen atom of the secondary amine structure of the morpholine reacts with the olefinic group thereby adding to and saturating the said olefinic group.

In conducting the reaction to produce the morpholine-olefinic polycarboxylic ester adducts, it is generally preferred to employ stoichiometric quantities of the two reactants, or a slight stoichiometric excess of morpholine, since the reactants combine in a 1:1 ratio. It is not necessary or advantageous to use a large excess of morpholine.

Although suitable unreactive solvents for the reactants can be used in the reaction mixture, it is not generally desirable or advantageous to employ such solvents. The morpholine and ester reactants are mutually soluble and provide a homogeneous reaction mixture without the incorporation of a solvent. Where the operator so desires, solvents such as the alcohols, benzene, toluene, and the like may be used.

The temperature and time of reaction can be varied depending, for example, upon the particular reactants employed, the rapidity and extent of reaction wanted, and other factors. It is generally preferred to carry out the reaction at a temperature between about 90° C. and about 130° C. Higher temperatures are not desirable, since there is danger of decomposition of the olefinic polycarboxylic ester. Temperatures considerably lower than 90° C. are not generally desirable, since the rate of reaction becomes too slow for practical operation. The morpholine-olefinic polycarboxylic ester adducts can generally be produced in good yield using a reaction time of about 15 hours at 90° to 110° C.

The isolation and recovery of the adduct from the reaction mixture can be accomplished without difficulty by conventional means. Distillation at a pressure below normal atmospheric pressure, solvent crystallization, and the like are generally preferred means for recovering and purifying the adduct.

It has been found that the morpholine-olefinic polycarboxylic ester adducts provided by the present invention exhibit useful rodent repellency properties. Triallyl morpholinyltricarballylate is particularly outstanding as a rodent repellent.

The following examples illustrate the preparation of the various adducts listed above. Examples 1, 2, and 3, demonstrating, in addition, the rodent repellency of the adducts involved in these examples.

Example 1

A mixture of 1 mole of triallyl aconitate and 1.15 moles of morpholine was maintained at 110° C. for 15 hours, after which time the color turned reddish-brown. The mixture was then vacuum distilled, a forerun of 55 grams being first removed and then the reaction product distilled at 150° C., 45 microns' pressure, at a distillation rate of 100 drops per minute. The pure, colorless, distilled reaction product (triallyl morpholinyltricarballylate) weighed 260 grams, which corresponds to a 68% yield. The refractive index of the product at 25° C. was 1.4847. It contained 57.93% carbon, 6.96% hydrogen, 3.59% nitrogen, and had a saponification equivalent of 136, as determined by conventional analytical procedures. Triallyl morpholinyltricarballylate ($C_{19}H_{27}O_7N$) has a theoretical content of 59.84% carbon, 7.09% hydrogen, 3.60% nitrogen, and a saponification equivalent of 127.

The triallyl morpholinyltricarballylate was tested as a rodent repellent in a conventional test procedure and found to have a high degree of rodent repellency. The test was conducted using albino and hooded rats (150–350 grams) and employing 2% of test compound in treated food. The test is based on the relative acceptance by rats of 20 grams of treated and 20 grams of untreated bait (food). The animals were allowed to feed ad libitum. The daily acceptance of each bait was recorded for 4 days, and the data were used to compute a repellency index by the following formula:

$$K = 100 - 1/100 W(8T_1 + 4T_2 + 2T_3 + T_4)(U_1 + U_2 + 2U_3 + 4U_4 + 8X)$$

where $W$=body weight in kg.; $T$=treated food eaten daily; $U$=untreated food eaten daily; and $X$=untreated food remaining after 4 days. A "K" value (repellency index of 85 or more denotes a high degree of repellency. The triallyl morpholinyltricarballylate had a repellency index of 98.0.

Example 2

A mixture of 0.78 mole of triethyl aconitate and 0.86 mole of morpholine was maintained at 90° C. for 15 hours. At the end of this time, the reaction mixture was vacuum distilled and the reaction product distilling at 128° C., 15 microns' pressure, at a distillation rate of 64 drops per minute was collected. The pure, colorless, distilled reaction product (triethyl morpholinyltricarballylate) weighed 198 grams, representing a 75% yield. Its refractive index at 25° C. was 1.4606. The product contained 55.95% carbon, 7.84% hydrogen, 4.03% nitrogen, and had a saponification equivalent of 120. Triethyl morpholinyltricarballylate ($C_{16}H_{27}O_7N$) has a theoretical content of 55.65% carbon, 7.83% hydrogen, 4.05% nitrogen, and a saponification equavalent of 115.

The triethyl morpholinyltricarballylate was tested as a rodent repellent, following exactly the same test procedure as described in Example 1. It was found to possess rodent repellency properties, having a repellency index of 32.0 as determined by the test procedure.

Example 3

An equimolar mixture of dibutyl fumarate, or dibutyl maleate, and morpholine was maintained at 90° C. for 15 hours, after which time the product was vacuum distilled at 130° C., 75 microns' pressure, at a distillation rate of 100 drops per minute. The yield of pure, distilled reaction product was 82% when dibutyl fumarate was used, and 66% when dibutyl maleate was used. The product, in each case, had a refractive index of 1.4562 at 25° C., and was shown by chemical analysis to be dibutyl morpholinylsuccinate. The product obtained using dibutyl fumarate contained 61.15% carbon, 9.36% hydrogen and 4.47% nitrogen. The product obtained using dibutyl maleate contained 60.69% carbon, 9.36% hydrogen and 4.29% nitrogen. Dibutyl morpholinylsuccinate ($C_{16}H_{29}O_5N$) has a theoretical content of 60.95% carbon, 9.21% hydrogen and 4.30% nitrogen.

A 15.75 gram portion of the dibutyl morpholinylsuccinate product was hydrolyzed by refluxing it for 3 hours with 50 ml. of 3.84 N aqueous sulfuric acid solution, removing the butanol as it was formed. The resultant solution was mixed with the exact quantity of aqueous barium hydroxide solution necessary to just neutralize the sulfuric acid, and the barium sulfate which formed was removed by filtration. The aqueous filtrate was allowed to evaporate to dryness, and the resultant solid was recrystallized from dioxane, then dried. The recrystallized material (morpholinylsuccinic acid) melted at 178°–179° C., with decomposition.

The dibutyl morpholinylsuccinate was tested as a rodent repellent, following exactly the same test procedure as described in Example 1. It was found to possess rodent repellency properties, having a repellency index of 44.0 as determined by the test procedure.

We claim:

1. A method of repelling rodents comprising applying to the environment from which the rodents are to be repelled a rodent repellent containing a morpholine-olefinic polycarboxylic ester adduct selected from the group consisting of triallyl morpholinyltricarballylate, triethyl morpholinyltricarballylate, and dibutyl morpholinylsuccinate as its essential active ingredient.

2. The method of claim 1 wherein the adduct is triallyl morpholinyltricarballylate.

3. The method of claim 1 wherein the adduct is triethyl morpholinyltricarballylate.

4. The method of claim 1 wherein the adduct is dibutyl morpholinylsuccinate.

References Cited in the file of this patent

UNITED STATES PATENTS

| 2,317,378 | Harris | Apr. 27, 1943 |
| 2,438,091 | Lynch | Mar. 16, 1948 |

FOREIGN PATENTS

| 573,154 | Great Britain | Nov. 8, 1945 |

OTHER REFERENCES

Frear et al.: J. of Economic Entomology, vol. 40, pages 736–745 (1947).